United States Patent [19]

Sudo et al.

[11] Patent Number: 4,746,316
[45] Date of Patent: May 24, 1988

[54] METHOD FOR MANUFACTURING A LUMINOUS TUBE FOR DISCHARGE LAMP

[75] Inventors: Shigeru Sudo, Kawasaki; Masahiko Hirose, Tokyo; Masaaki Yada, Kawasaki; Hitoshi Imamura, Yokohama, all of Japan

[73] Assignee: Kabushiki Kaisha Toshiba, Kawasaki, Japan

[21] Appl. No.: 408,876

[22] Filed: Aug. 17, 1982

Related U.S. Application Data

[63] Continuation of Ser. No. 299,921, Sep. 8, 1981, which is a continuation of Ser. No. 857,998, Dec. 6, 1977, abandoned.

[30] Foreign Application Priority Data

| Dec. 7, 1976 | [JP] | Japan | 51-146110 |
| Dec. 10, 1976 | [JP] | Japan | 51-147849 |
| Dec. 14, 1976 | [JP] | Japan | 51-149359 |
| Jan. 12, 1977 | [JP] | Japan | 52-1455 |

[51] Int. Cl.$^4$ .............................................. H01J 9/40
[52] U.S. Cl. .................................................... 445/43
[58] Field of Search .......................... 445/38, 40, 43, 44

[56] References Cited

U.S. PATENT DOCUMENTS

| 2,417,061 | 3/1947 | Chilcot et al. | |
| 2,449,676 | 9/1948 | Seitz | 445/43 |
| 3,243,635 | 3/1966 | Louden et al. | 313/317 |
| 3,623,712 | 11/1971 | McNeilly et al. | 263/41 |
| 3,628,846 | 12/1971 | Cortorillo | 316/19 |
| 3,643,299 | 2/1972 | Brown | 29/25.16 |
| 3,949,186 | 4/1976 | Nakayama et al. | 219/121 EM |

FOREIGN PATENT DOCUMENTS 776539 11/1974 Japan .

*Primary Examiner*—Kenneth J. Ramsey
*Attorney, Agent, or Firm*—Oblon, Fisher, Spivak, McClelland & Maier

[57] ABSTRACT

A method for manufacturing a luminous tube for discharge lamp including sealing, in a closed container having a stream of a desired gas introduced therein, components of a luminous tube by means of the photo energy of a laser light such that the desired gas, at a predetermined pressure, is sealed within the luminous tube.

7 Claims, 2 Drawing Sheets

F I G. 3
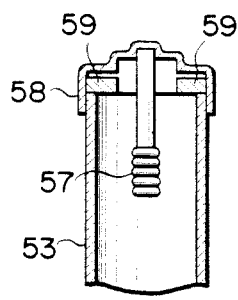
F I G. 4
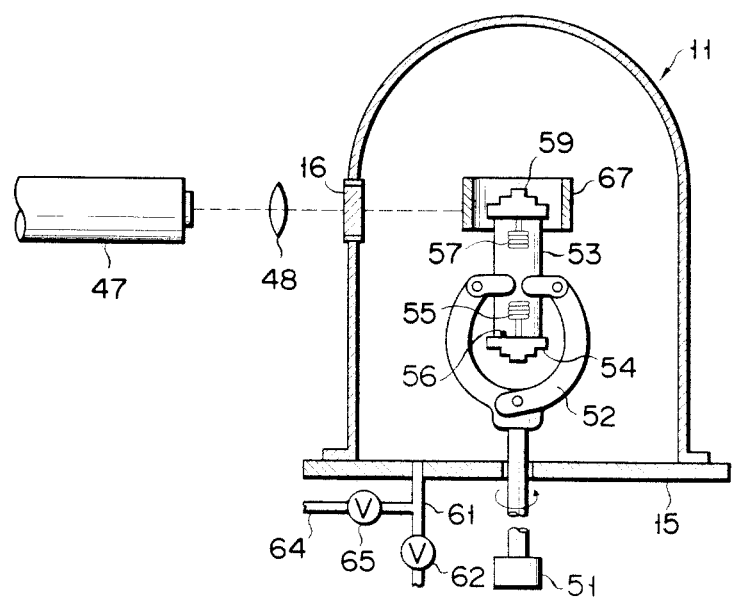

METHOD FOR MANUFACTURING A LUMINOUS TUBE FOR DISCHARGE LAMP

This is a continuation of application Ser. No. 299,921, filed Sept. 8, 1981, which is a continuation of application Ser. No. 857,998, filed Dec. 6, 1977 and now abandoned.

BACKGROUND OF THE INVENTION

1. Field of the Invention

This invention relates to a method for manufacturing a luminous tube for discharge lamp, and in particular to a method for sealing components of the luminous tube to each other.

2. Description of the Prior Art

A high pressure discharge lamp, such as metal halide lamp, includes a luminous tube composed of a usually tubular discharge vessel formed of a light-transmissive material, such as quartz glass, and metal halide, mercury, and rare gases as luminous elements sealed therein. At both ends of the discharge vessel are disposed main electrodes made of e.g. tungsten, respectively.

In manufacturing such luminous tube exhaust pipes have conventionally been used. That is, a fine exhaust pipe is provided to the side wall of the quartz glass discharge vessel with the prescribed main electrodes disposed at both ends thereof, and the gas inside the discharge vessel is sucked from the exhaust pipe to keep the internal pressure at $10^{-6}$ torr or below. Thereafter, a rare gas, such as argon is introduced from the exhaust pipe into the discharge vessel to a prescribed pressure, e.g., 20 torr, the predetermined luminous elements are enclosed through a fine pipe, and the exhaust pipe is chipped-off usually by using a gas flame, such as oxygen-hydrogen flame, thus manufacturing the luminous tube.

Thus, in the method using the exhaust pipe, exhaust requires much time and the undesired gases in the vessel may not be fully removed, which may damage the properties of the resultant luminous tube, such as discharge starting voltage. Further, the gas, especially hydrogen, used as the flame source for chippinhg the exhaust pipe may frequently penetrate through the wall of the discharge vessel to be mixed in the vessel or occluded in the vessel wall. The hydrogen mixed in the discharge vessel may adversely affect the discharging condition due to the reaction with the luminous elements in the luminous tube or the action of the hydrogen itself. As for the hydrogen occluded in the vessel wall, it is discharged into the vessel when the luminous tube is operated, causing problems of the same kind. In addition, traces of the exhaust pipe, i.e., projected chipped-off portions will be left, so that an alumina coating layer, as a heat insulator, is applied to such portion to improve the properties of the luminous tube, through such coating layer will reduce the light-transmissivity of the vessel. Moreover, the chipped-off portion may often be thinned, which will lead to explosion of the luminous tube while in use.

SUMMARY OF THE INVENTION

An object of this invention is to provide an improved method for manufacturing a luminous tube for discharge lamp.

Another object of the invention is to provide a method for manufacturing a luminous tube without using any exhaust tube.

Still another object of the invention is to provide a method for manufacturing a luminous tube including a process for sealing components of the luminous tube in a relatively short time.

An additional object of the invention is to provide a method for manufacturing a luminous tube with uniformity and high quality.

According to the invention, there is provided a method for manufacturing a luminous tube for discharge lamp, comprising disposing in a closed container components of a luminous tube with sealing edges in close vicinity to each other so that the sealing edges come into contact with a fusion member to be fused by heating, and applying a laser light so that the fusion member is heat-fused by the photo energy of the laser light, thereby sealing the components of the luminous tube to each other by means of the fusion member.

BRIEF DESCRIPTION OF THE DRAWINGS

This invention will be more fully understood when taken in conjunction with the accompanying drawings, in which:

FIG. 3 is a sectional view of a part of the discharge vessel sealed by the method of the invention; and FIG. 4 shows an apparatus used with still another embodiment of the manufacturing method of the invention.

DETAILED DESCRIPTION OF THE PREFERRED EMBODIMENTS

Figure 1:
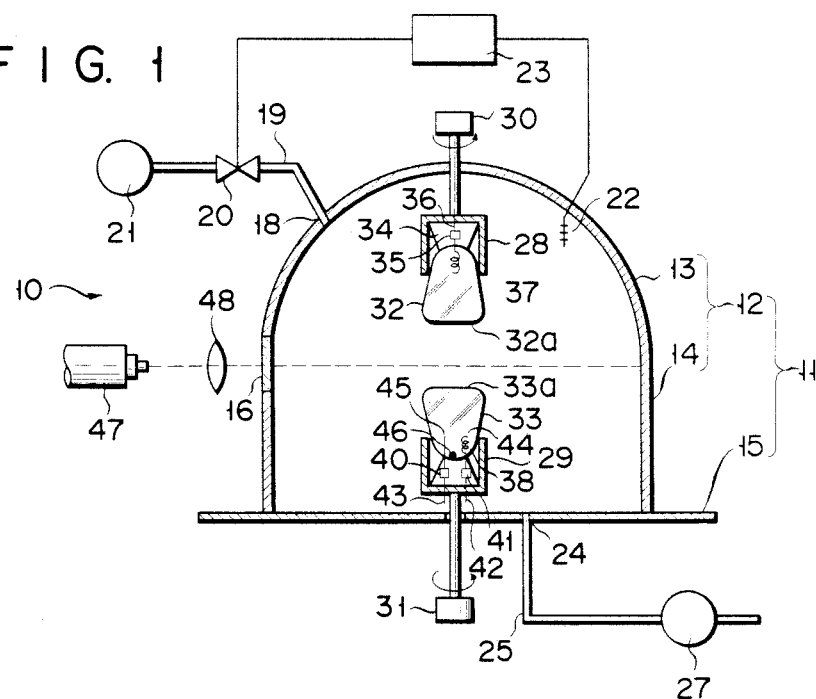
FIG. 1 shows an apparatus used with an embodiment of the manufacturing method of this invention.

This invention will now be described with reference to the accompanying drawings. In these drawings the same portions or parts are denoted by the same reference numerals.

In an embodiment of the manufacturing method according to the invention, the sealing edges of the components of the luminous tube constitute the fusion member. Referring first to FIG. 1, there will be described this embodiment. As illustrated, an apparatus 10 used with the method of this invention has a closed container 11 consisting of a cover 12 composed of a dome portion 13 and a cylinder portion 14 integrally formed therewith, and a bottom plate 15 hermetically fixedly supporting the cover 12. The cylinder portion 14 of the cover 12 is provided with a window 16 formed of germanium (generally preferred), silicon, zinc-selenium alloy or the like material that transmits laser light without being damaged thereby. The dome portion 13 of the cover 12, provided with an opening 18, is connected with a gas cylinder 21 through a variable leak valve 20 by means of a pipe 19 with one end portion hermetically fitted in the opening 18. In the container 11 is inserted a pressure sensor 22 for detecting the internal pressure, which is connected with the valve 20 by means of a controller 23. The controller 23 is operated by a signal generated by the sensor 22 responding to the internal pressure detected, thereby controlling the opening of the valve 20.

Further, the bottom plate 15, provided with an aperture 24 opening into the container 11, is connected with an exhaust pump 27 by means of a pipe 25 with one end portion hermetically fitted in the aperture 24.

In the container 11 a pair of jigs 28 and 29 extend from the respective central portions of the dome 13 and bottom plate 15, the jigs 28 and 29 being rotatably supported by suitable driving mechanisms 30 and 31 respectively. The upper driving mechanism 30 serves to move the upper jig 28 up and down. These upper and lower jigs 28 and 29 respectively hold half sections 32 and 33 of a tube made of quartz glass which are to form the tubular discharge vessel of the discharge lamp to be manufactured. In the upper half section 31 is disposed a main electrode 37 which is led out of the tube by means of a lead wire 36 through a molybdenum leaf 35 sealed with a pinch seal 34. On the other hand, in the lower half section 33 is disposed a main electrode 44 and an auxiliary electrode 45 which are led out of the tube by means of lead wires 42 and 43 through molybdenum leaves 41 and 41 sealed with a pinch seal 38, respectively. The lower half section contains prescribed luminous elements 46 including metal halide, mercury, etc.

Outside the container 11 there is disposed a laser light source, e.g., $CO_2$ laser light source 47 so that laser beam may pass through a substantially central portion of the window 16. Between the laser light source 47 and the window 16 is arranged a lens 48 as a condenser.

In manufacturing the luminous tube by using the apparatus with the aforementioned construction in accordance with this invention, the pump 27 is first operated to adjust the pressure inside the container 11 at $10^{-6}$ torr or below, and then the controller 23 is operated to opern the valve 20, thereby introducing from the cylinder 21 into the container a gas of the same kind as the gas to be enclosed in the luminous tube, such as argon. Then, a gas is little by little delivered from the gas cylinder 21 through the valve 20 and the internal gas is gradually discharged by means of the pump 27 while keeping the gas pressure inside the container 11 at the same level as the pressure of the gas to be enclosed in the luminous tube, thereby producing in the container 11 a gas stream at a fixed pressure, e.g., 20 torr. The quantity of gas introduced may be adjusted by the opening control of the variable leak value 20 by means of the controller 23 which operates in response to the signal from the sensor 22.

Subsequently, the upper jig 28 is lowered to bring a sealing face 32a of the upper half section 32 into contact with a sealing face 33a of the lower half section 33. In this state, a $CO_2$ laser beam with the wavelength of e.g. 10.6 μm from the laser light source 47, suitably constricted by means of the lens 48, is applied to the adjacent sealing edges of the half sections 32 and 33 while synchronously rotating the upper and lower jigs 28 and 29 in the direction as indicated by arrows by means of the driving mechanisms 30 and 31. The sealing edges of the half sections 32 and 33 are heat-fused by the photo energy of the laser light applied, and joined with each other. Thus, there may be obtained with ease and in a relatively short time a luminous tube that is charged with the desired gas at the fixed pressure and is free from the chipped-off portion of the exhaust tube.

According to the above-mentioned method, there is no need of using such a gas flame for chipping the exhaust pipe that has conventionally been used in the manufacture of the prior art luminous tubes, so that there may be caused no mixture or occlusion of undesired gases in the luminous tube or in the luminous tube wall. Therefore, there may be obtained a luminous tube that emits little gas from its wall in operation, exhibits good electrical properties such as starting voltage, and secures prolonged life. Further, freed from such chipped-off portion as has been characteristic of the prior art luminous tubes, the luminous tubes obtained may have uniform optical properties. Moreover, the method of the invention uses the laser light, so that it ensures advantages that the processing can be achieved in a relatively short time, the power consumption may be lower, and evaporation of the luminous materials may be prevented due to the possibility of local heating.

Since in the above method the stream of the desired gas under the fixed pressure is produced inside the container, there exist hardly any undesired gases within the container. Accordingly, there may be obtained higher-quality luminous tubes without any possibility of undesired gases being enclosed in the discharge vessel. The method of the invention, however, can be also achieved without producing any gas stream in the container. That is, after keeping the internal pressure of the container at a fixed level of reduced pressure, the aforesaid operations may be conducted with the desired gas introduced into the container to the prescribed pressure.

Figure 2:
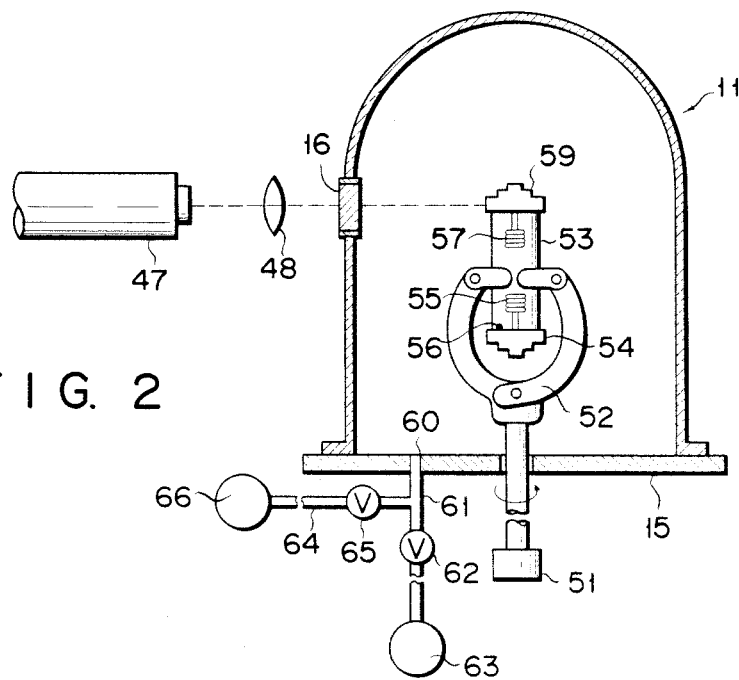
FIG. 2 shows an apparatus used with another embodiment of the manufacturing method of the invention.

The principle of this invention is also applicable to the sealing of a light-transmissive ceramic discharge vessel, such as a light-transmissive alumina tube, with a high-fusion-point metal cap, such as niobium cap, by means of glass solder, as in manufacturing the luminous tubes for high pressure sodium lamps. As shown in FIG. 2, a light-transmissive ceramic tube, e.g., a light-transmissive alumina tube 53 is vertically supported in the container 11 by jig 52 inserted into the container 11 through the bottom plate 15 and the rotatable by means of a driving mechanism 51. The bottom end of the alumina tube 53 is hermetically attached by a cap 54 formed of high-fusion-point metal such as niobium, which fixes a coil electrode 55, by means of glass solder. The alumina tube 53 contains a luminous element, e.g., sodium amalgam 56. At the top end portion of the alumina tube 53, as shown in detail in FIG. 3, a niobium cap 58 fixing a coil electrode 57 is so disposed as to directly cover the outside of the top end portion of the alumina tube 53. Further, on the top end face of the alumina tube 53 is disposed a glass solder 59 in contact with the inner surface of the niobium cap 58.

The exhaust of gas from the container 11, as well as the introduction of gas thereinto, may be achieved by means of a pump 63 connected through a valve 62 with a pipe 61 with one end hermetically inserted in an aperture 60 of the bottom plate 15 as well as by a gas cylinder 66 connected through a valve 65 with a pipe 64 branching off to the pipe 61.

As for the operation, it is performed in a similar manner to that described with reference to FIG. 1. That is, the valve 62 is opened with the valve 65 kept closed, and the container 11 is exhausted to keep the internal pressure at a fixed level of reduced pressure, e.g., $10^{-6}$ to $10^{-7}$ torr. Thereafter, the valve 62 is closed, the valve 65 is opened, and a desired rare gas such as xenon is introduced into the container 11 to set the internal pressure at a fixed level, e.g., 20 torr.

In this state, while rotating the alumina tube 53 by rotating the jig 52 in the direction as indicated by arrow in FIG. 2 by means of the driving mechanism 51, a laser beam from the laer light source 47, suitably constricted by means of the lens 48, is applied through the transmission window 16 to a portion of the surface of the niobium cap 58 corresponding to an area at which the niobium cap 58 is in contact with both of the glass solder 59 and alumina tube 53. Consequently, the top end portion of the alumina tube 53 absorbs the photo energy of the laser light and produces heat in a relatively short time to fuse the glass solder 59, and then the niobium cap 58 and alumina tube 53 are sealed to each other by means of the glass solder 59.

Heretofore, in sealing the aforesaid alumina tube and niobium cap by means of glass solder, a cylindrical exothermic body made of tantalum has been so disposed as to surround a substantial portion of the alumina tube including the sealing area of the alumina tube and niobium cap, the glass solder being fused by means of heat produced by energizing the exothermic body, or by heating the cylindrical tantalum exothermic body by means of a high-frequency heater disposed on the outer periphery of the closed container. In such conventional method, however, there is required a large consumption of power, and besides the heat covers a wide range, so that the luminous element in the tube, such as sodium amalgam, must be cooled, thereby requiring extra equipment. Further, the wide heating range will cause the undesired gases adsorbed or occluded by the container and tantalum exothermic body to be emitted, making it difficult to keep the pressure of the enclosed rare gas constant for each product. Moreover, the tantalum exothermic cylinder may reach by heating a temperature as high as 1,500° C. or more, so that the crystals of tantalum may possibly be rendered coarse and deformed, often requiring the exothermic cylinder to be replaced with a new one.

According to this invention, the use of the laser light enables local heating with smaller power consumption and can eliminate the conventional defects as stated above.

FIG. 4 shows an apparatus substantially the same as that shown in FIG. 2, provided a relatively short cylinder 67 formed of a material with high laser light absorbability, such as boron nitride, is so disposed as to surround the niobium cap 58 and the top end portion of the alumina tube 53. The laser beam from the laser light source 47 is applied to the cylinder 67, which is heated by the photo energy of the laser light, and the glass solder 59 is fused by the heat of the cylinder 67. Since the laser light source can supply a large energy to a narrower area, the exothermic cylinder 67 used with this embodiment may be smaller, requiring no such cooling of the sodium amalgam as has been required in the prior art.

What we claim is:

1. A method of manufacturing a luminous tube for a discharge lamp by a laser light source utilizing a closed container with a window positioned in a wall portion thereof and which comprises material which transmits laser light and including a tubular component of a cylindrical discharge vessel and a first and second high-fusion-point metal cap component, said first and second components each having an electrode, a sealing portion, and a glass solder member, which comprises:
   positioning in said container said tubular component and said first and second components adjacent each other so that each said sealing portion is disposed in contact with said glass solder member so as to be subsequently fused together by heating;
   positioning a short cylinder in said container to be heated by photo energy of said laser light source so as to surround a point of contact of said tubular component and said first and second components with said glass solder member;
   maintaining the atmosphere inside said container at the same level as that of an atmosphere of a desired gas to be enclosed in the luminous tube, said gas atmosphere being formed from a stream of said desired gas introduced into said container;
   successively applying laser light from said laser light source from outside said container to said cylinder through said window so as to heat said cylinder by the photo energy of said laser light and to fuse each said glass solder member by the heat of said cylinder while said stream of said desired gas is introduced into said container; and
   successively sealing said tubular component to said first and second components to produce the luminous tube and to enclose said gas atmosphere within the luminous tube.

2. A method according to claim 1, which further comprises disposing a luminous element in said first component.

3. A method according to claim 1, wherein said cylinder comprises a high laser light absorbable material.

4. A method according to claim 3, wherein said cylinder comprises boron nitride.

5. A method according to claim 1, wherein said tubular component comprises light-transmissive ceramic material.

6. A method according to claim 5, wherein said tubular component comprises alumina.

7. A method according to claim 1, wherein said first and second component comprises niobium.

* * * * *